United States Patent
Ueno et al.

(10) Patent No.: US 6,263,691 B1
(45) Date of Patent: Jul. 24, 2001

(54) REFRIGERANT RECOVERING APPARATUS AND REFRIGERANT RECOVERING METHOD

(75) Inventors: Takeo Ueno; Toshihiro Iijima; Masaaki Takegami, all of Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/508,362

(22) PCT Filed: Sep. 8, 1998

(86) PCT No.: PCT/JP98/04014

§ 371 Date: Mar. 10, 2000

§ 102(e) Date: Mar. 10, 2000

(87) PCT Pub. No.: WO99/14539

PCT Pub. Date: Mar. 25, 1999

(30) Foreign Application Priority Data

Sep. 12, 1997 (JP) .................................................. 9-248337

(51) Int. Cl.[7] ..................................................... F25B 45/00
(52) U.S. Cl. .................................... 62/292; 62/77; 62/195
(58) Field of Search .............................. 62/292, 149, 77, 62/85, 195, 470, 474, 475

(56) References Cited

U.S. PATENT DOCUMENTS

| | | |
|---|---|---|
| 4,539,817 | 9/1985 | Staggs et al. . |
| 4,969,495 * | 11/1990 | Grant .................................. 62/292 X |
| 5,193,351 * | 3/1993 | Laukhuf et al. ......................... 62/77 |
| 5,203,177 * | 4/1993 | Manz et al. ............................ 62/149 |
| 5,245,840 * | 9/1993 | Van Steenburgh, Jr. ............... 62/292 |
| 5,277,033 | 1/1994 | Sanford et al. . |
| 5,327,741 * | 7/1994 | Mason et al. ........................ 62/149 |
| 5,582,019 | 12/1996 | Hanna et al. . |
| 5,638,690 * | 6/1997 | Berglof ............................. 62/475 X |
| 5,671,605 * | 9/1997 | Helterbrand ............................ 62/85 |
| 5,709,091 * | 1/1998 | Todack .................................. 62/85 |

FOREIGN PATENT DOCUMENTS

| | | |
|---|---|---|
| 7-243723 | 9/1995 | (JP) . |
| 8-303909 | 11/1996 | (JP) . |
| 97 15789 | 5/1997 | (WO) . |

* cited by examiner

Primary Examiner—Michael Powell Buiz
Assistant Examiner—Chen Wen Jiang
(74) Attorney, Agent, or Firm—Birch, Stewart, Kolasch & Birch, LLP

(57) ABSTRACT

This refrigerant recovery system is provided with recovery piping 2, heat exchangers 25, 26 and check valves 30, 31, 37, 38. A refrigerant within the recovery piping 2 is heated and cooled by the heat exchangers 25, 26, so that a fluid power is imparted to the refrigerant. This fluid power is regulated to one direction by the check valves 30, 31, 37, 38, by which the refrigerant is transferred in one way within the recovery piping 2. Thus, the refrigerant can be recovered from a gas line 3 and a liquid line 5 with high efficiency. Also, a degassing circuit 306 makes the gas refrigerant within the recovery container 71 merged with the refrigerant within the recovery piping 2 cooled by the heat exchanger 25 or 26, by which the recovery container 71 can be degassed. Also, the refrigerant can be recovered to the recovery container 71 smoothly, so that the refrigerant can be recovered efficiently.

11 Claims, 2 Drawing Sheets

US 6,263,691 B1

REFRIGERANT RECOVERING APPARATUS AND REFRIGERANT RECOVERING METHOD

This application is the national phase under 35 U.S.C. §371 of PCT International Application No. PCT/JP98/04014 which has an International filing date of Sep. 8, 1998, which designated the United States of America.

TECHNICAL FIELD

The present invention relates to a refrigerant recovery system and a refrigerant recovery method for recovering a refrigerant in an air conditioner, a refrigerator or the like.

BACKGROUND ART

From the recent years' environmental point of view or the like, it has been proposed to use HFC (hydrofluorocarbon) alternative refrigerants instead of CFC (chlorofluorocarbon) or HCFC (hydrochlorofluorocarbon) conventional refrigerants. In order to replace conventional refrigerants with alternative refrigerants, it is necessary to recover conventional refrigerants.

However, since conventional refrigerant recovery systems employ a suction pump, there is a problem that the efficiency would inevitably be poor.

DISCLOSURE OF THE INVENTION

Therefore, an object of the present invention is to provide a refrigerant recovery system and a refrigerant recovery method which are capable of recovering refrigerants with high efficiency.

In order to achieve the above object, the present invention provides a refrigerant recovery system comprising:

recovery piping;
a heat exchanger for heat exchanging with a refrigerant within the recovery piping; and
refrigerant flow regulating means for regulating a flowing direction of the refrigerant within the recovery piping in one way.

In this refrigerant recovery system, the refrigerant within the recovery piping is heated and cooled by the heat exchanger so that a fluid power is imparted to the refrigerant. This fluid power is regulated to one way by the refrigerant flow regulating means, by which the refrigerant is transferred in one direction within the recovery piping. Thus, the refrigerant can be recovered from recovery targets. According to this invention, by heating and cooling the refrigerant, the refrigerant can be recovered efficiently.

Also, a refrigerant recovery system of one aspect of the present invention comprises:

recovery piping;
a heat exchanger connected to the recovery piping; and
refrigerant flow regulating means for regulating a flowing direction of the refrigerant within the recovery piping in one way, wherein
the heat exchanger alternately iterates a suction operation of sucking in the refrigerant from the recovery piping into the heat exchanger by cooling the gas refrigerant within the heat exchanger to effectuate a pressure reduction, and a recovery operation of recovering the liquid refrigerant from the heat exchanger to a recovery container by heating the refrigerant within the heat exchanger to effectuate a pressurization.

In this refrigerant recovery system, the heat exchanger alternately iterates a suction operation of sucking in the refrigerant from the recovery piping into the heat exchanger by cooling the gas refrigerant within the heat exchanger to effectuate a pressure reduction, and a recovery operation of recovering the liquid refrigerant from the heat exchanger to a recovery container by heating the refrigerant within the heat exchanger to effectuate a pressurization. Thus, the refrigerant can be recovered from recovery targets. According to this invention, by heating and cooling the refrigerant, the refrigerant can be recovered efficiently.

Also, a refrigerant recovery system of another aspect of the present invention comprises:

recovery piping;
two heat exchangers connected to the recovery piping such that the two exchangers are parallel to each other; and
refrigerant flow regulating means for regulating a flowing direction of the refrigerant within the recovery piping in one way, wherein the heat exchangers alternately iterate, between these heat exchangers, a suction operation of sucking in the refrigerant from the recovery piping into the heat exchangers by cooling the gas refrigerant within the heat exchangers to effectuate a pressure reduction, and a recovery operation of recovering the liquid refrigerant from the heat exchangers to a recovery container by heating the refrigerant within the heat exchangers to effectuate a pressurization.

In this refrigerant recovery system, the two heat exchangers connected in parallel alternately iterate a suction operation of sucking in the refrigerant from the recovery piping into the heat exchangers by cooling the gas refrigerant within the heat exchangers to effectuate a pressure reduction, and a recovery operation of recovering the liquid refrigerant from the heat exchangers to a recovery container by heating the refrigerant within the heat exchangers to effectuate a pressurization. Thus, the refrigerant can be recovered from recovery targets. According to this refrigerant recovery system, by heating and cooling the refrigerant, the refrigerant can be recovered efficiently.

Also, one embodiment further comprises a degassing circuit for merging the gas refrigerant within the recovery container connected to the recovery piping, with the refrigerant within the recovery piping cooled by the heat exchanger.

In this refrigerant recovery system, the degassing circuit makes the gas refrigerant within the recovery container merged with the refrigerant within the recovery piping cooled by the heat exchanger, by which the recovery container can be degassed. As a result of this degassing of the recovery container, the refrigerant can be recovered to the recovery container smoothly, so that the refrigerant can be recovered efficiently.

Also, one embodiment further comprises a heating circuit for introducing, and heating, the refrigerant heated by the heat exchanger and thereby formed into hot gas, to external piping or external equipment connected to the recovery piping.

In this refrigerant recovery system, the heating circuit introduces, and heats, the refrigerant heated by the heat exchanger and thereby formed into hot gas, to external piping or external equipment connected to the recovery piping. As a result of this, by introducing the hot gas to cooled part out of the external piping or external equipment and thereby evaporating condensed refrigerant within this part, the refrigerant recovery can be facilitated.

Also, one embodiment further comprises a degassing circuit for merging the gas refrigerant within the recovery container connected to the recovery piping, with the refrigerant within the recovery piping cooled by the heat exchanger; and a heating circuit for performing a heating operation by introducing the refrigerant heated by the heat exchanger and thereby formed into hot gas, to external piping or external equipment connected to the recovery piping.

In this refrigerant recovery system, the refrigerant is transferred in one way by the heat exchanger and the refrigerant flow regulating means. The recovery container is degassed by the degassing circuit, by which the refrigerant is recovered to the recovery container smoothly. Then, the hot gas derived from the heat exchanger is introduced to cooled part out of the external piping or external equipment by the heating circuit, by which condensed refrigerant is evaporated. As a result of these operations, the refrigerant can be recovered efficiently.

Also, one embodiment further comprises fluidizing the refrigerant by heat exchanging with a refrigerant within recovery piping by means of a heat exchanger;

regulating a flowing direction of the refrigerant in one way by means of refrigerant flow regulating means; and recovering the refrigerant from a recovery target.

In this refrigerant recovery method, by transferring the refrigerant in one way within the recovery piping by means of the heat exchanger and the refrigerant flow regulating means, the refrigerant can be recovered from recovery targets efficiently.

Also, another embodiment further comprises accumulating the refrigerant sent from the recovery piping in a recovery container; and degassing the recovery container by merging the gas refrigerant within the recovery container, with the refrigerant within the recovery piping cooled by the heat exchanger by means of a degassing circuit.

In this refrigerant recovery method, by degassing the recovery container by means of the degassing circuit, the refrigerant can be recovered to the recovery container smoothly, so that the refrigerant can be recovered efficiently.

Also, one embodiment further comprises introducing, and heating, the refrigerant heated by the heat exchanger and thereby formed into hot gas, to external piping or external equipment connected to the recovery piping by means of a heating circuit.

In this refrigerant recovery method, the heating circuit introduces, and heats, the refrigerant heated by the heat exchanger and thereby formed into hot gas, to cooled part out of the external piping or the external equipment, by which condensed refrigerant is evaporated. Thus, the refrigerant recovery can be facilitated.

Also, one embodiment further comprises accumulating the refrigerant sent from the recovery piping in a recovery container;

degassing the recovery container by merging the gas refrigerant within the recovery container, with the refrigerant within the recovery piping cooled by the heat exchanger, by means of a degassing circuit; and performing a heating operation by introducing the refrigerant heated by the heat exchanger and thereby formed into hot gas, to external piping or external equipment connected to the recovery piping, by means of a heating circuit.

In this refrigerant recovery method, by transferring the refrigerant in one way by means of the heat exchanger and the refrigerant flow regulating means, and by degassing the recovery container by means of the degassing circuit, the refrigerant can be recovered to the refrigerant recovery smoothly. Further by introducing the hot gas derived from the heat exchanger to cooled part out of the external piping or the external equipment by means of the heating circuit so that condensed refrigerant is evaporated. Thus, the refrigerant can be recovered efficiently.

BEST MODE FOR CARRYING OUT THE INVENTION

Hereinbelow, the present invention is described in detail by way of embodiments thereof illustrated in the accompanying drawings.

(First Embodiment)

Figure 1:
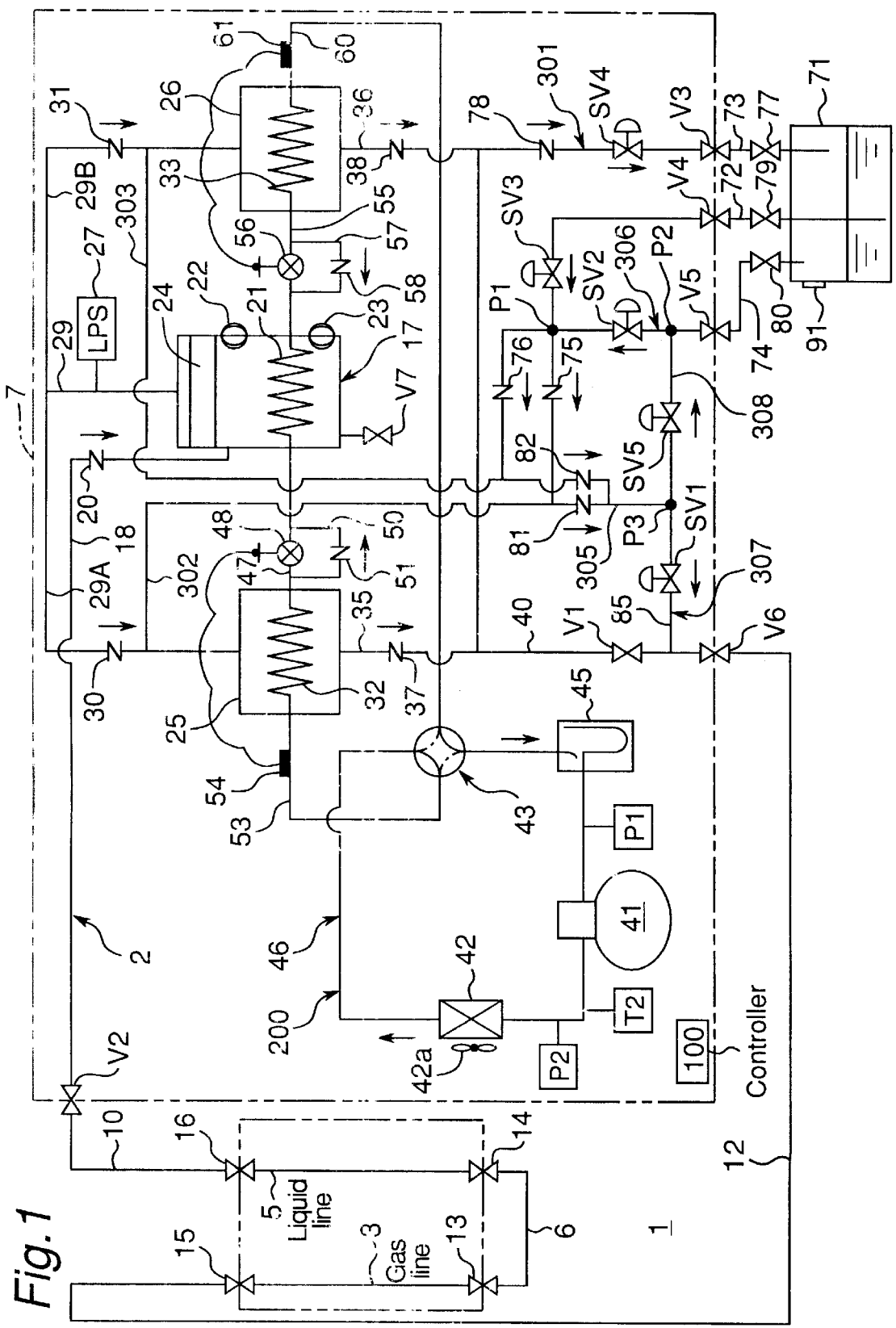
FIG. 1 is a refrigerant circuit diagram showing an embodiment of the refrigerant recovery system according to the present invention.

FIG. 1 shows a first embodiment of the refrigerant recovery system according to the present invention. The refrigerant recovery system 1 is equipped with a cleaning recovery circuit 2. In this cleaning recovery circuit 2, a cleaning refrigerant, which is composed of R22, is circulated to clean existing connecting piping which comprises a gas line 3 and a liquid line 5. Moreover, the cleaning recovery circuit 2 can also be capable of recovering the refrigerant contained in the circuit.

This cleaning recovery circuit 2 has a pipe 6 for directly connecting a valve 13 provided at an end of the gas line 3 and a valve 14 provided at an end of the liquid line 5 to each other, a pipe 10 connected between a valve 16 provided at the other end of the liquid line 5 and a valve V2 provided at an inflow port of a cleaning recovery unit 7, and a pipe 12 connected between a valve 15 provided at the other end of the gas line 3 and a valve V6 provided at an outflow port of the cleaning recovery unit 7.

The cleaning recovery unit 7 is provided with an oil separator 17, and a liquid refrigerant is introduced into the oil separator 17 through an introductory pipe 18 connected between the oil separator 17 and the valve V2 placed at the inflow port. Also, the introductory pipe 18 is provided with a check valve 20 which permits a refrigerant flow from the valve V2 to the oil separator 17. The introductory pipe 18 is connected at a point of a side wall of the oil separator 17 slightly upper than the vertical center of the side wall.

The oil separator 17 has, in lower part, a heat exchanging coil 21, and this heat exchanging coil 21 is connected to a later-described heat pump circuit. With this heat exchanging coil 21, the liquid refrigerant introduced from the introductory pipe 18 is evaporated. Also, an upper liquid level sensor 22 and a lower liquid level sensor 23 are attached on a side wall at upper and lower positions of the coil 21. These upper liquid level sensor 22 and lower liquid level sensor 23 are implemented by float switches.

The oil separator 17 has a filter 24 fitted thereto at a position slightly below a top plate thereof and above the connecting point of the introductory pipe 18. When the refrigerant evaporated by the coil 21 passes through the filter 24, foreign matters in the refrigerant are removed by the passage. Further, a discharge valve V7 is set at the bottom of the oil separator 17, so that oil accumulated at the bottom can be discharged through this discharge valve V7.

A pipe 29 is connected to the top plate of the oil separator 17, and this pipe 29 is branched into pipes 29A and 29B so as to be connected to a top plate of a first transfer heat exchanger 25 and a top plate of a second transfer heat exchanger 26, respectively. The pipe 29 has a low pressure sensor 27 provided above the top plate of the oil separator 17. Also, the pipes 29A, 29B are provided with check valves 30, 31, respectively. These check valves 30, 31 permit refrigerant flows from the oil separator 17 to the transfer heat exchangers 25, 26, respectively.

The transfer heat exchangers 25, 26 have heat exchanging coils 32, 33, and the heat exchanging coils 32, 33 are connected to a later-described heat pump circuit 200. Then, pipes 35, 36 are connected to bottoms of the transfer heat exchangers 25, 26, respectively, and these pipes 35, 36 are connected to a cleaning use merged pipe 40 and a recovery use merged pipe 301 via check valves 37, 38 (forward directed toward the valve V6 placed at the outflow port), respectively. The cleaning use merged pipe 40 is connected via a valve V1 to the valve V6 placed at the outflow port. Also, the recovery use merged pipe 301 is connected to an exit valve V3 via a check valve 78 (forward directed toward a refrigerant cylinder 71) and a solenoid valve SV4. The exit valve V3 is connected to a refrigerant expelling line 73 having a valve 77 and extending to within the refrigerant cylinder 71. The refrigerant expelling line 73 is piping for feeding the cleaning refrigerant from the first, second transfer heat exchangers 25, 26 to the refrigerant cylinder 71.

To this refrigerant cylinder 71, are connected a refrigerant resupply line 72 and a pressurizing/depressurizing line 74.

The refrigerant resupply line 72 is piping for resupplying the cleaning refrigerant to the first, second transfer heat exchangers 25, 26. The refrigerant resupply line 72 is connected to a connecting point P1 via a valve 79, a valve V4 and a solenoid valve SV3. To this connecting point P1, are connected a pipe 302 which is connected to a downstream of the check valve 30 on the branch pipe 29A, and a pipe 303 connected to a downstream of the check valve 31 on the branch pipe 29B. The pipe 302 has a check valve 75 (reverse directed toward the refrigerant cylinder 71), while the pipe 303 has a check valve 76 (reverse directed toward the refrigerant cylinder 71).

Further, the pressurizing/depressurizing line 74 is connected from the connecting point P1 to a valve V5 via a solenoid valve SV2, and extends from this valve V5 via a valve 80 to within the refrigerant cylinder 71.

Also, bypass lines 305 are connected to the pipes 302 and 303 in the upstream of the check valves 75 and 76. These bypass lines 305 join together via check valves 81 and 82, and are connected to a downstream of the valve V1 on the merged pipe 40 by a pipe 85 having a solenoid valve SV1.

The pipes 302, 303, the connecting point P1 and the pressurizing/depressurizing line 74 constitute a degassing circuit 306. This degassing circuit 306 enables the refrigerant cylinder 71 as a recovery container to be degassed.

Also, the pipes 302, 303, the bypass line 305 and the pipe 85 constitute a heating circuit 307. This heating circuit 307 allows hot gas within the transfer heat exchangers 25, 26 to be introduced into the pipe 12 so that heating can be achieved.

Further, a pipe 308 having a solenoid valve SV5 connects the degassing circuit 306 and the heating circuit 307 to each other. This pipe 308 is connected between a point P2 upstream of the solenoid valve SV2 of the degassing circuit 306 and a point P3 upstream of the solenoid valve SV1 of the heating circuit 307. The pipe 308, the pressurizing/depressurizing line 74, the bypass line 305 and the pipes 302, 303 constitute a pressurizing line 310.

Meanwhile, the heat pump circuit 200 has piping 46 for connecting a compressor 41, a heat exchanger 42, a four-way switching valve 43, the first transfer heat exchanger 25, the oil separator 17, the second transfer heat exchanger 26, the four-way switching valve 43, an accumulator 45 and the compressor 41 in this order. A motor-operated expansion valve 48 is provided on a pipe 47 for connecting the first transfer heat exchanger 25 and the oil separator 17 to each other, and a check valve 51 (forward directed toward the oil separator 17) is provided on a pipe 50 which bypasses this motor-operated expansion valve 48. The motor-operated expansion valve 48 is controlled in degree of openness with a signal derived from a heat sensing cylinder 54 attached to a pipe 53 placed on a side opposite to the motor-operated expansion valve 48 with respect to the first transfer heat exchanger 25. Also, a motor-operated expansion valve 56 is provided on a pipe 55 which connects the oil separator 17 and the second transfer heat exchanger 26 to each other, and a check valve 58 (forward directed toward the oil separator 17) is provided on a pipe 57 which bypasses this motor-operated expansion valve 56. The motor-operated expansion valve 56 is controlled in degree of openness with a signal derived from a heat sensing cylinder 61 attached to a pipe 60 placed on a side opposite to the motor-operated expansion valve 56 with respect to the second transfer heat exchanger 26.

Besides, a pressure sensor P1 is attached on a suction-side pipe of the compressor 41, while a temperature sensor T2 and a pressure sensor P2 are attached on a discharge-side pipe of the compressor 41.

(Cleaning Operation)

Next, operation of cleaning the piping with the refrigerant recovery system of this construction is explained, First, while the four-way switching valve 43 of the heat pump circuit 200 is in a state shown by solid line in FIG. 1, the compressor 41 is operated, by which a refrigerant is transferred from the compressor 41 to the first transfer heat exchanger 25 via the heat exchanger 42. Then, the first transfer heat exchanger 25 serves as a condenser. In addition, the heat exchanger 42 plays a role of controlling the refrigerant temperature by making the heat of the refrigerant discharged out to a specified amount at a preceding stage of the first transfer heat exchanger 25. This heat exchange amount of the heat exchanger 42 can be controlled by turning on/off a fan 42a. Also, the degree of openness of the motor-operated expansion valve 48 is changed depending on the level of the temperature detected by the heat sensing cylinder 54 attached on the pipe 53, so that the temperature of the refrigerant that flows into the oil separator 17 is held within a specified temperature range. With a small degree of openness of the motor-operated expansion valve 48, the amount of refrigerant that flows from the bypass pipe 50 via the check valve 51 into the oil separator 17 increases.

Then, the refrigerant that has lowered in temperature through the first transfer heat exchanger 25 flows into the heat exchanging coil 21 of the oil separator 17, where the refrigerant heats, and thereby evaporates, the cleaning refrigerant that has flowed into the oil separator 17 by passing through the introductory pipe 18 via the valve V2.

The refrigerant that has been further cooled by having passed through the oil separator 17 subsequently passes through the motor-operated expansion valve 56 or the bypass pipe 57, and flows into the heat exchanging coil 33 of the second transfer heat exchanger 26. Then, this second transfer heat exchanger 26 serves as an evaporator.

In addition, the degree of openness of the motor-operated expansion valve 56 is changed, larger or smaller, depending on the level of the temperature detected by the heat sensing cylinder 61 attached on the pipe 60, so that the temperature of the refrigerant that flows into the second transfer heat exchanger 26 is held within a specified temperature range. In the case where the four-way switching valve 43 has been switched over to the broken-line position, with a small degree of openness of the motor-operated expansion valve 56, the amount of refrigerant that flows from the second transfer heat exchanger 26 into the oil separator 17 via the bypass pipe 57 increases.

Then, the refrigerant that has passed through the second transfer heat exchanger 26 enters the accumulator 45 via the four-way switching valve 43 and thereafter, in a gaseous state, returns to the compressor 41.

By such operation of the heat pump circuit 200, the cleaning refrigerant that has been flowed in from the valve V2 placed at the inflow port of the cleaning recovery unit 7 first flows into the oil separator 17, where the cleaning refrigerant is evaporated by the lower-part heat exchanging coil 21, thereby separated from oil, and foreign matters are removed from the cleaning refrigerant by the upper-part filter 24. Then, the cleaning refrigerant at a gaseous state goes up through the pipe 29.

At this place, the second transfer heat exchanger 26 is in sucking operation, while the first transfer heat exchanger 25 is in discharging operation. Therefore, the cleaning refrigerant flows from the pipe 29 toward the pipe 29B, and cooled by the heat exchanging coil 33 of the second transfer heat exchanger 26, thereby being transformed from a gas refrigerant into a liquid refrigerant and accumulated within the second transfer heat exchanger 26. Then, when the second transfer heat exchanger 26 is filled with the liquid-phase cleaning refrigerant, the pump-side refrigerant, as it is cooled, is sucked into the compressor 41, causing the discharge temperature of the compressor 41 to lower, with the result that the detected temperature of the temperature sensor T2 lowers below a specified temperature. Then, a controller 100, receiving a signal from the temperature sensor T2, switches the four-way switching valve 43 to the broken-line position.

Then, the refrigerant flowing direction of the heat pump circuit 200 is switched over, so that the first a transfer heat exchanger 25 performs a cooling operation while the second transfer heat exchanger 26 performs a heating operation. As a result of this, the cleaning refrigerant in the gaseous state derived from the oil separator 17 flows into the first transfer heat exchanger 25, and cooled so as to be transformed into a liquid refrigerant and accumulated within the first transfer heat exchanger 25. Meanwhile, in the second transfer heat exchanger 26, the liquid refrigerant accumulated by the preceding cooling operation is heated and increased in pressure, and sent out to the pipe 36.

Then, subsequently, when the liquid refrigerant is accumulated and filled up in the first transfer heat exchanger 25, the cooled refrigerant flows from the pipe 53 to the compressor 41 so that the controller 100 switches over the four-way switching valve 43 to the solid-line position upon receiving a signal derived from the temperature sensor T2.

In addition, in the above description, it has been arranged that the four-way switching valve 43 is switched over when the discharge temperature of liquid of the compressor 41 has lowered by the refrigerant flowing from a transfer heat exchanger that performs the cooling operation to the compressor 41. Otherwise, the four-way switching valve 43 may also be switched over by detecting with the pressure sensor P2 that the discharge pressure of the compressor 41 has increased by the liquid-phase cleaning refrigerant having flowed out from the transfer heat exchanger that performs the heating operation so that the heat exchange amount of the refrigerant on the pump circuit side has lowered. Furthermore, the four-way switching valve 43 may be switched over when the internal pressure of the oil separator 17 detected by the low pressure sensor 27 has increased to the discharge temperature equivalent saturation pressure of the compressor 41 by the liquid-phase cleaning refrigerant being filled in the transfer heat exchanger that performs the cooling operation.

By the basic operation of the heat pump as described above, the gas line 3 and the liquid line 5 as existing connecting piping can be cleaned with the cleaning refrigerant forcedly circulated through the cleaning recovery circuit 2. Accordingly, it becomes feasible to reuse the existing connecting piping, so that the laying work can be simplified to a great extent.

It is noted that all the solenoid valves SV1, SV2, SV3, SV4 and SV5 are kept closed in the above basic operation.
(Refrigerant Recovery Operation After Piping Cleaning)

Next, refrigerant recovery operation after the piping cleaning is explained. Upon completion of the cleaning of the piping, the valve V1 is closed and the solenoid valve SV4 is opened. Thus, the cleaning refrigerant derived from the transfer heat exchangers 25, 26 can be recovered from the refrigerant expelling line 73 to the refrigerant cylinder 71 via the recovery use merged pipe 301. During this operation, the valve V4 and the valve V7 are kept closed.
(Degassing of Refrigerant Cylinder on Refrigerant Recovery Operation)

Next, degassing operation of the refrigerant cylinder 71 upon the above refrigerant recovery operation is explained.

With a high internal pressure of the refrigerant cylinder 71, or with the refrigerant cylinder 71 filled up, in an attempt to recover excess refrigerant from the refrigerant recovery circuit 2 to the refrigerant cylinder 71 by the aforementioned cleaning refrigerant, the refrigerant would not be returned from the refrigerant expelling line 73 to the refrigerant cylinder 71. When a float switch 91 attached to the refrigerant cylinder 71 indicates that the refrigerant cylinder 71 has been filled up, the refrigerant cylinder 71 should be replaced. When the refrigerant expelling operation is disabled with the float switch 91 not indicating a full, the controller 100, deciding that the internal pressure of the refrigerant cylinder 71 has been increased, performs the degassing operation of the refrigerant cylinder 71 In this case, it is also possible to directly measure the internal pressure of the refrigerant cylinder 71 to verify that the internal pressure has been increased. Further, with the provision of a pressure sensor for detecting the internal pressure of the refrigerant cylinder 71, the degassing operation for the cylinder may be automatically carried out by means of the controller 100 by detecting that the internal pressure of the refrigerant cylinder 71 has increased.

As to the above degassing operation, the solenoid valve SV2 is kept opened for a specified time period (e.g., 15 sec.), so that upper part of the refrigerant cylinder 71 is communicated with upper parts of the transfer heat exchangers 25, 26 via the valve V5, the solenoid valve SV2 and the check valves 75, 76 of the degassing circuit 306. As a result of this, the pressurizing line 74 serves as a depressurizing line so that the gas refrigerant within the refrigerant cylinder 71 can be expelled via the solenoid valve SV2 serving as a pressure-reducing valve toward a cooling-side heat exchanger out of the transfer heat exchangers 25 and 26.

By such a degassing operation for the refrigerant cylinder 71, the cleaning refrigerant can be recovered smoothly from the cleaning recovery circuit 2 via the recovery use merged pipe 301 to the refrigerant cylinder 71, and the refrigerant recovery efficiency can be improved.

(Heating of Piping on Refrigerant Recovery Operation)

When the pressure in the oil separator 17 is higher than the pressure in the gas line 3 or the liquid line 5, or when the liquid refrigerant has been accumulated in the gas line 3 as a result of the phenomenon that the refrigerant within the gas line 3 evaporates by itself, causing the temperature of the gas line 3 to lower and resultantly causing the liquid refrigerant to be attached on the wall surface, the cleaning refrigerant comes to flow less smoothly, making the refrigerant recovery operation difficult to achieve.

In such a case, the low pressure sensor 27 operates. Then, the controller 100 makes the solenoid valve SV1 of the heating circuit 307 opened (e.g., for 15 seconds) so that hot gas is expelled from upper parts in a heat exchanger that is under the pressurizing operation out of the first transfer heat exchanger 25 and the second transfer heat exchanger 26, and then makes this hot gas led from the pipe 12 to the gas line 3 after sequentially passing the pipe 302 or 303, the bypass line 305 and the pipe 85. As a result of this, the first or second transfer heat exchanger 25, 26 can be pressure-reduced and moreover the liquid refrigerant within the gas line 3 can be re-evaporated. Accordingly, the cleaning refrigerant can be made to flow more smoothly from the gas line 3 and the liquid line 5 toward the oil separator 17, thus allowing the refrigerant to be recovered from the recovery use merged pipe 301 to the refrigerant cylinder 71 with higher efficiency.

Also, when the low pressure sensor 27 is operated at shorter intervals than a specified time period, the controller 100, deciding that the liquid refrigerant is not left in the gas line 3 or the liquid line 5, closes the solenoid valve SV4, ending the refrigerant recovery operation.

In addition, by setting the timing of opening the solenoid valve SV1 to a timing of switching over the four-way switching valve 43, hot gas can be taken out while the heating gas pressure in the transfer heat exchanger 25 or 26 is at a maximum. Thus, the refrigerant flow can be further facilitated.

(Refrigerant Recovery for Refrigerator (Updated Refrigerator))

Figure 2:
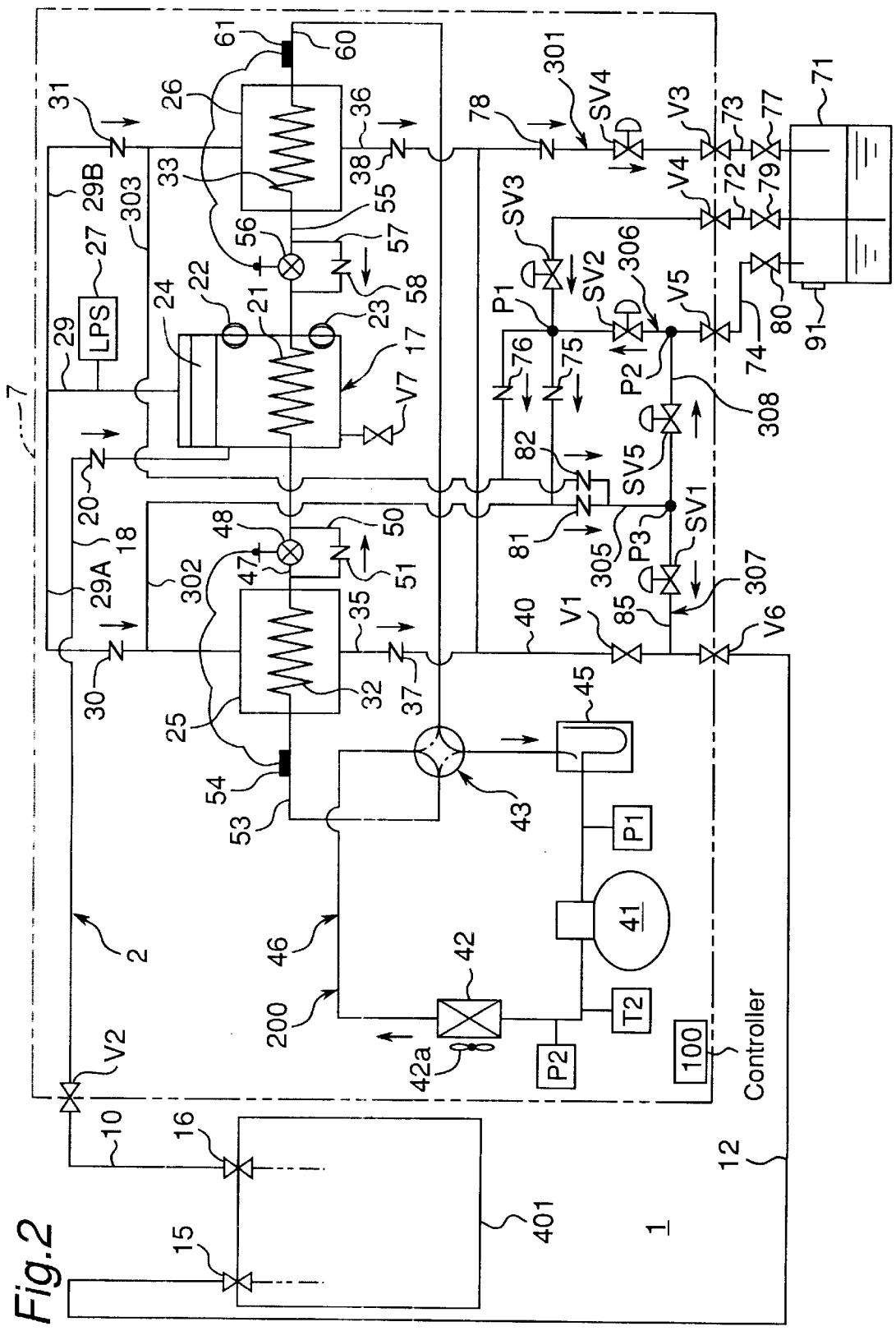
FIG. 2 is a refrigerant circuit diagram for recovering the refrigerant of a refrigerator with the refrigerant recovery system of the above embodiment.

Next, operation for recovering the refrigerant of a refrigerator 401 to the refrigerant cylinder 71 by means of the refrigerant recovery unit 7 of the above embodiment is explained with reference to FIG. 2.

First, the pipe 10 is connected to a valve 16 of the refrigerator 401, and the pipe 12 is connected to a valve 15. This valve 16 communicates with the liquid line of the refrigerator 401, while the valve 15 communicates with the gas line of the refrigerator 401.

Next, the valves V1, V4, V7 are closed, the solenoid valves SV1, SV2, SV3, SV5 are closed, and the solenoid valve SV4 is opened.

Next, by operating the compressor 41 and thereby making the heat pump circuit 200 work, the refrigerant can be recovered from the refrigerator 401, by passing through the pipe 10, the oil separator 17, the first, second transfer heat exchangers 25, 26, the recovery use merged pipe 301 and the solenoid valve SV4 and further through the refrigerant expelling line 73 to the refrigerant cylinder 71.

(Degassing of Refrigerant Cylinder During Refrigerant Recovery from Refrigerator)

Operation of the cleaning recovery unit 7 in the degassing operation for the refrigerant cylinder 71 during the refrigerant recovery from the refrigerator 401 is similar to the "Degassing of Refrigerant Cylinder on Refrigerant Recovery Operation After Piping Cleaning" as described above. By this degassing operation, the internal pressure of the refrigerant cylinder 71 is lowered, so that the refrigerant derived from the refrigerator 401 can be recovered to the refrigerant cylinder 71 smoothly.

(Heating of Refrigerator on Refrigerant Recovery from Refrigerator)

When the pressure in the oil separator 17 is higher than the pressure in the refrigerator 401, or when the liquid refrigerant has been accumulated in the refrigerator 401 as a result of self-evaporation of the refrigerant within the refrigerator 401, the refrigerant comes to flow less smoothly, making the refrigerant recovery operation difficult to achieve.

In such a case, hot gas derived from the transfer heat exchangers 25, 26 is introduced to the refrigerator 401 via the pipe 12, by which the oil separator 17 is pressure-reduced while the refrigerator 401 is heated, so that the accumulated liquid refrigerant within the refrigerator 401 is re-evaporated. As a result of this, the refrigerant can be made to flow more smoothly from the refrigerator 401 to the cleaning recovery unit 7, so that the refrigerant recovery efficiency can be enhanced.

The operation of the cleaning recovery unit 7 on the heating operation for this refrigerator 401 is similar to the operation in "Heating of Piping on Refrigerant Recovery Operation) as described above.

In addition, in this embodiment, the first, second transfer heat exchangers 25, 26 have been provided and made to perform discharge operation and suction operation alternately, so that the refrigerant is recovered continuously. Otherwise, it is also possible that only one of either the first or the second transfer heat exchanger is provided, where heating (discharge) and cooling (suction) are iterated by this one transfer heat exchanger so that the refrigerant is intermittently recovered.

INDUSTRIAL APPLICABILITY

As described above, the refrigerant recovery system and the refrigerant recovery method according to the present invention are applicable to the recovery of refrigerants in existing refrigerant piping, and in particular useful in replacing conventional refrigerants with alternative refrigerants.

What is claimed is:

1. A refrigerant recovery system comprising:
   recovery piping (2);
   a heat exchanger (25, 26) for heat exchanging with a refrigerant within the recovery piping (2);
   refrigerant flow regulating means (30, 31, 37, 38) for regulating a flowing direction of the refrigerant within the recovery piping (2) in one way; and
   a degassing circuit (306) for merging the gas refrigerant within the recovery container (71) connected to the recovery piping (2), with the refrigerant within the recovery piping (2) cooled by the heat exchanger (25, 26).

2. A refrigerant recovery system comprising:
   recovery piping (2);
   a heat exchanger (25, 26) connected to the recovery piping (2); and
   refrigerant flow regulating means (30, 31, 37, 38) for regulating a flowing direction of the refrigerant within the recovery piping (2) in one way, wherein
   the heat exchanger (25, 26) alternately iterates a suction operation of sucking in the refrigerant from the recovery piping (2) into the heat exchanger (25, 26) by cooling the gas refrigerant within the heat exchanger (25, 26) to effectuate a pressure reduction, and a recovery operation of recovering the liquid refrigerant from the heat exchanger (25, 26) to a recovery container (71) by heating the refrigerant within the heat exchanger (25, 26) to effectuate a pressurization.

3. A refrigerant recovery system comprising:

recovery piping (2);

two heat exchangers (25, 26) connected to the recovery piping (2) such that the two exchangers (25, 26) are parallel to each other; and refrigerant flow regulating means (30, 31, 37, 38) for regulating a flowing direction of the refrigerant within the recovery piping (2) in one way, wherein the heat exchangers (25, 26) alternately iterate, between these heat exchangers, a suction operation of sucking in the refrigerant from the recovery piping (2) into the heat exchangers (25, 26) by cooling the gas refrigerant within the heat exchangers (25, 26) to effectuate a pressure reduction, and a recovery operation of recovering the liquid refrigerant from the heat exchangers (25, 26) to a recovery container (71) by heating the refrigerant within the heat exchangers (25, 26) to effectuate a pressurization.

4. The refrigerant recovery system according claims 2 or 3, further comprising:

a degassing circuit (306) for merging the gas refrigerant within the recovery container (71) connected to the recovery piping (2), with the refrigerant within the recovery piping (2) cooled by the heat exchanger (25, 26).

5. The refrigerant recovery system according to claims 2 or 3, further comprising:

a heating circuit (307) for introducing, and heating, the refrigerant heated by the heat exchanger (25, 26) and thereby formed into hot gas, to external piping (3, 5) or external equipment (401) connected to the recovery piping (2).

6. The refrigerant recovery system according claims 2 or 3, further comprising:

a degassing circuit (306) for merging the gas refrigerant within the recovery container (71) connected to the recovery piping (2), with the refrigerant within the recovery piping (2) cooled by the heat exchanger (25, 26); and a heating circuit (307) for performing a heating operation by introducing the refrigerant heated by the heat exchanger (25, 26) and thereby formed into hot gas, to external piping (3, 5) or external equipment (401) connected to the recovery piping (2).

7. The refrigerant recovery method comprising:

fluidizing the refrigerant by heat exchanging with a refrigerant within recovery piping (2) by means of a heat exchanger (25, 26);

regulating a flowing direction of the refrigerant in one way by means of refrigerant flow regulating means (30, 31, 37, 38);

recovering the refrigerant from a recovery target (3, 5, 401);

accumulating the refrigerant sent from the recovery piping (2) in a recovery container (71); and degassing the recovery container (71) by merging the gas refrigerant within the recovery container (71), with the refrigerant within the recovery piping (2) cooled by the heat exchanger (25, 26) by means of a degassing circuit (306).

8. The refrigerant recovery method comprising:

fluidizing the refrigerant by heat exchanging with a refrigerant within recovery piping (2) by means of a heat exchanger (25, 26);

regulating a flowing direction of the refrigerant in one way by means of refrigerant flow regulating means (30, 31, 37, 38);

recovering the refrigerant from a recovery target (3, 5, 401); and introducing, and heating, the refrigerant heated by the heat exchanger (25, 26) and thereby formed into hot gas, to external piping (3, 5) or external equipment (401) connected to the recovery piping (2) by means of a heating circuit (307).

9. The refrigerant recovery method comprising:

fluidizing the refrigerant by heat exchanging with a refrigerant within recovery piping (2) by means of a heat exchanger (25, 26);

regulating a flowing direction of the refrigerant in one way by means of refrigerant flow regulating means (30, 31, 37, 38);

recovering the refrigerant from a recovery target (3, 5, 401);

accumulating the refrigerant sent from the recovery piping (2) in a recovery container (71);

degassing the recovery container (71) by merging the gas refrigerant within the recovery container (71), with the refrigerant within the recovery piping (2) cooled by the heat exchanger (25, 26), by means of a degassing circuit (306); and performing a heating operation by introducing the refrigerant heated by the heat exchanger (25, 26) and thereby formed into hot gas, to external piping (3, 5) or external equipment (401) connected to the recovery piping (2), by means of a heating circuit (307).

10. A refrigerant recovery system comprising:

recovery piping (2);

a heat exchanger (25, 26) for heat exchanging with a refrigerant within the recovery piping (2);

refrigerant flow regulating means (30, 31, 37, 38) for regulating a flowing direction of the refrigerant within the recovery piping (2) in one way;

a degassing circuit (306) for merging the gas refrigerant within the recovery container (71) connected to the recovery piping (2), with the refrigerant within the recovery piping (2) cooled by the heat exchanger (25, 26); and a heating circuit (307) for introducing, and heating, the refrigerant heated by the heat exchanger (25, 26) and thereby formed into hot gas, to external piping (3, 5) or external equipment (401) connected to the recovery piping (2).

11. A refrigerant recovery system comprising:

recovery piping (2);

a heat exchanger (25, 26) for heat exchanging with a refrigerant within the recovery piping (2);

refrigerant flow regulating means (30, 31, 37, 38) for regulating a flowing direction of the refrigerant within the recovery piping (2) in one way;

a degassing circuit (306) for merging the gas refrigerant within the recovery container (71) connected to the recovery piping (2), with the refrigerant within the recovery piping (2) cooled by the heat exchanger (25, 26); and a heating circuit (307) for performing a heating operation by introducing the refrigerant heated by the heat exchanger (25, 26) and thereby formed into hot gas, to external piping (3, 5) or external equipment (401) connected to the recovery piping (2).

* * * * *